United States Patent
Iyer et al.

(10) Patent No.: US 12,506,689 B2
(45) Date of Patent: Dec. 23, 2025

(54) STORING AND SELECTION OF ENTRIES IN ROUTING TABLES BASED ON PREFIX LENGTH

(71) Applicant: Arista Networks, Inc., Santa Clara, CA (US)

(72) Inventors: Ramakrishnan Ganapathy Iyer, Trivandrum (IN); Vishal Bandekar, Bangalore (IN)

(73) Assignee: Arista Networks, Inc., Santa Clara, CA (US)

( * ) Notice: Subject to any disclaimer, the term of this patent is extended or adjusted under 35 U.S.C. 154(b) by 373 days.

(21) Appl. No.: 18/161,639

(22) Filed: Jan. 30, 2023

(65) Prior Publication Data
US 2024/0259312 A1    Aug. 1, 2024

(51) Int. Cl.
*H04L 45/748* (2022.01)

(52) U.S. Cl.
CPC .................. *H04L 45/748* (2013.01)

(58) Field of Classification Search
CPC ..................................................... H04L 45/748
See application file for complete search history.

(56) References Cited

U.S. PATENT DOCUMENTS

| | | | |
|---|---|---|---|
| 2019/0173791 A1* | 6/2019 | Lim | H04L 45/54 |
| 2021/0075724 A1* | 3/2021 | Nagre | H04L 45/20 |
| 2021/0392167 A1* | 12/2021 | Sweeney | H04L 45/34 |
| 2024/0137317 A1* | 4/2024 | Wang | H04L 49/1546 |

* cited by examiner

*Primary Examiner* — Jung H Park
(74) *Attorney, Agent, or Firm* — Sprinkle IP Law Group

(57) ABSTRACT

Systems and methods for the storing and distribution of routes with different length prefixes between different tables in network devices utilizing lookup strengths associated with prefix lengths are disclosed. The results from performing lookups in these tables may have associated lookup strengths based on the prefix length of the associated routes, and the evaluation of which route to utilize for packet processing can be determined utilizing these associated lookup strengths. In this manner, a desired route for such packet processing may be determined regardless of the table where a route resides.

20 Claims, 7 Drawing Sheets

STORING AND SELECTION OF ENTRIES IN ROUTING TABLES BASED ON PREFIX LENGTH

BACKGROUND

In computer networks, network devices may provide switching (e.g., Layer 2 operations of the 7-layer Open Systems Interconnection Model) and/or routing (e.g., Layer 3 operations of the 7-layer Open Systems Interconnection Model) functionality. These network devices store routing data in memory for routing data packets in a network. The routing data may be stored in a data structure where the number of routing entries in the data structure is limited due to size constraints of hardware in the network device. In large networks, these constraints may reduce efficiency or limit the design of a network or network device. In particular, different types of routing data may be distributed between different data structures in a network device, where these data structures may have constraints that affect the storage and distribution of such routing data between data structures. The storage and distribution of the routing data between these data structures may therefore be based on a number of considerations and may, for example, affect lookups in, or the effective utilization of, those tables.

What is desired, then, is to better optimize the storage and distribution of the routing data between data structures in network devices to reduce the impacts on the storage and lookup of such routing data.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Figure 1:
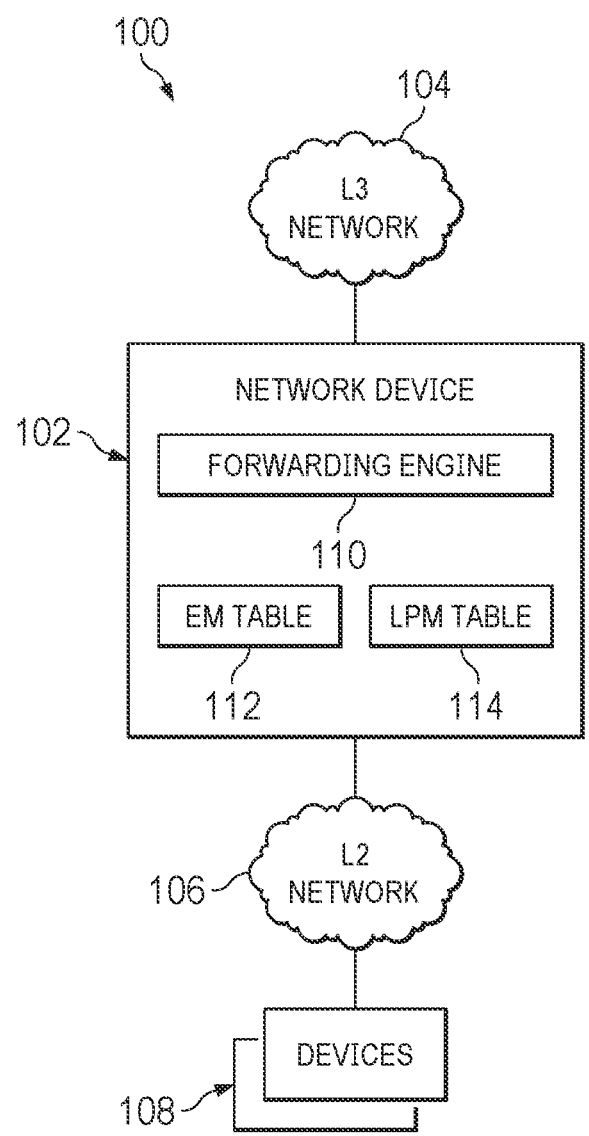
FIG. 1 is a block diagram illustrating a network environment including an embodiment of a network device.

As discussed, security in computer networks is becoming more critical and complex as networks are increasingly relied upon for communications in a variety of applications and settings. In typical network architectures, devices (hosts) communicating in the network are connected to a network interface of a network device, such as a router or switch, which controls the flow of packets in the network. These network devices may thus be utilized to control access to such networks.

In computer networks, network devices may provide switching (e.g., Layer 2 operations of the 7-layer Open Systems Interconnection Model) and/or routing (e.g., Layer 3 operations of the 7-layer Open Systems Interconnection Model) functionality. These network devices store routing data in memory for routing data packets in a network. The routing data may be stored in a data structure where the number of routing entries (also referred to herein as route entries) in the data structure is limited due to size constraints of hardware in the network device. In large networks, this size constraint may reduce routing efficiency or limit the design of a network or network device.

Specifically, a (large) exact match (LEM or EM) table is typically used for programming Layer 2 addresses (e.g., media access control (MAC) addresses) for use of the network device as a network switch. A longest prefix match (LPM) table is typically used to program Layer 3 addresses for use of the network device as a router. For example, each entry in the tables may include an address and next hop data (e.g., re-write data). The address (also referred to as the route) may correspond to the destination of the packet and the next hop data may be an address that is the next hop for the packet. As the size of the number of available addresses grows over time, so too does the size of routing tables and the amount of memory involved in storing the routing tables.

When a network device is primarily used as a router, the utilization of the EM table (e.g., to store Layer 2 addresses) may be low because the primary function of the router is to route packets for the Layer 3 network, and not forward packets for the Layer 2 network. That is, there may not be many directly connected devices that are forwarding packets in the Layer 2 network using Layer 2 addresses (e.g., MAC addresses). To better utilize the EM table, then, a network device may use the EM table (e.g., in addition to the LPM table) to store eligible Layer 3 routes (e.g., entries comprising the Layer 3 route and the corresponding next hop corresponding to that Layer 3 route) that typically would be stored in the LPM table. Accordingly, using the EM table to store Layer 3 routes optimizes the amount of storage that the network device can use to store both Layer 2 addresses and Layer 3 routes.

Each of the routes for a routing entry for Layer 3 routing can comprise a prefix of a particular length. Since the EM is an exact match table, it cannot typically be used to store route entries for routes of all prefix lengths (e.g., from 0 to 32). Instead, in one implementation, a number of prefix lengths (e.g., two) may be selected to be stored in the EM table. Accordingly, Layer 3 routes that have a prefix length that matches those configured prefix lengths are eligible to be stored in the EM table while other routes may be stored in the LPM table. In some cases, routes associated with the configured prefix lengths may be optimized, whereby these optimized routes are installed in the EM table and the remaining routes are stored in the LPM table.

According to the architectures of some network devices (e.g., the architecture of the hardware of such network devices), whenever a more specific (i.e., longer prefix) route in the LEM is entered into the forwarding information base (FIB) comprising the Layer 3 routing entries (e.g., in both the EM and the LPM), any existing corresponding (e.g., less specific) routes in the EM are moved from the EM to the LPM. In many instances, such movement is required because of architectural limitations in the hardware of such network devices and, in particular, limitations in the pipeline of certain processor architectures pertaining to the resolution of lookups (e.g., of route addresses) between the EM and LPM tables. Specifically, in certain hardware architectures lookups in the EM table may have a fixed priority over lookups in the LPM table. Thus, a matching lookup result from the EM table may always be prioritized for use in forwarding over a matching lookup result from the LPM, even when the matching lookup result from the LPM table is associated with a route with a more specific prefix.

As may be realized, such a result is less than desirable. What is desired, instead, is the ability to store and distribute associated routing entries in the FIB where routes with more specific prefixes can be stored in the LPM while associated routes with less specific prefixes can simultaneously be stored in the EM, where the correct route (e.g., most specific route) is selected for forwarding when a lookup is performed, regardless of the location where that route is stored.

To address these desires, among others, embodiments as disclosed may allow such storing and distribution of routes with more specific prefixes in the LPM while associated routes with less specific prefixes exist in the EM by utilizing lookup strengths associated with prefix lengths. In particular, certain embodiments as disclosed may employ at least two tables to store an FIB comprising routing entries. A table as used herein, will be understood to mean any memory, data structure or combination of memory or data structure that may be used to store and retrieve associated data. Accordingly, these different tables may utilize different types of lookups. For example, one of the tables may be an EM table, while another one of the tables may be an LPM table. The routing entries stored in each table may comprise a route having a prefix length and corresponding routing data (e.g., next hop data).

To ensure that route entries with routes having less specific (shorter) prefix lengths may be stored in one type of table (e.g., the EM) while associated route entries with more specific (longer) prefix lengths are simultaneously stored in the other type of table (e.g., the LPM), lookup strengths associated with different prefix lengths are utilized. Specifically, embodiments may utilize a lookup strength table (i.e., any data structure or association) whereby a lookup strength can be associated with a particular prefix length (i.e., one or more prefix lengths or ranges of prefix lengths) and table (e.g., the EM table or the LPM table). As such, this lookup strength table can be configured such that a lookup strength for certain prefix length routes in one of the tables comprising the FIB (e.g., the EM) may be set at one strength while a lookup strength for more specific (longer) prefix lengths that are stored in another table of the FIB (e.g., the LPM) may be set at another, greater, strength. Additionally, in some embodiments, a lookup strength for less specific (shorter) prefix lengths that are stored in one table of the FIB (e.g., the LPM) may be set at a lesser strength than more specific (longer) prefix lengths stored in another table of the FIB (e.g., the EM).

For example, as discussed, network devices may be configured such that only routes with certain prefix lengths (e.g., a prefix length associated with optimized routes) may be stored in the EM table. In such instances, the lookup strength table may be configured such that the lookup strength for those prefix lengths associated with the EM table is set at a particular strength. Additionally, the lookup strength table may be configured so a greater lookup strength is associated with prefix lengths in the LPM table that are more specific than the prefix lengths which are to be stored in the EM table.

Accordingly, when a packet with a particular destination address is received at the network device, a lookup may be performed in the different tables comprising the FIB (e.g., the EM table and the LPM table) based on the destination address of the packet. Any matching entries from each of the tables can be identified along with their corresponding lookup strength, as determined based on the prefixes lengths of the matching entries, the table of the FIB (e.g., the EM or LPM table) in which the matching entries reside, and the lookup strengths for those tables and prefix lengths as defined in the lookup strength table. The matching entry with the highest lookup strength can be accessed to determine the routing data of that entry, and the packet sent from the network device according to that routing data. In this manner, the lookup result comprising the most specific route (e.g., the route with the longest prefix) may be selected regardless of the location (e.g., in the LPM or EM) where the entry matching the lookup resides.

It will be noted that while a useful application of embodiments is for packet forwarding in network devices as discussed, similar lookups can be performed in the tables of the FIB for almost any feature implemented at the network device that utilizes such routing information. For example, in many network devices reverse path forwarding (RPF, including Unicast RPF (URPF)) is implemented. RPF is a feature which helps to recognize packets coming in with spoofed source IP and drop such packets to prevent malicious attacks. RPF involves looking up the source IP address of a packet (e.g., of the IPv4 header) in the routing table. The result of the RPF lookup (source IP address) provides an interface and an RPF check makes sure this interface obtained from the lookup result is the same as the interface on which the packet came in. According to the architectures of network devices (e.g., including their hardware or the like) the same routing tables may be utilized for forwarding lookups and RPF lookups.

Thus, according to embodiments, when a source address (e.g., an IPv4 or IPv6 address) is obtained in association with a packet, and an RPF lookup is performed based on that source IP address, a lookup may be performed in the different tables comprising the FIB (e.g., the EM table and the LPM table) based on the source address. When performing such an RPF lookup, the lookup strengths as configured in the lookup strength table may be utilized such that a matching entry with a highest lookup strength can be accessed to determine the routing data of that entry for the RPF check. In this manner, the lookup result comprising the most specific route (e.g., the route with the longest prefix) may be utilized for RPF regardless of the location (e.g., in the LPM or EM) where the entry matching the lookup resides.

Embodiments may thus provide a number of advantages. Specifically, embodiments may better utilize certain tables of the FIB (e.g., the LEM table) while also avoiding any extra load on the processor of the network device that would be entailed by the movement of entries between the tables (e.g., the LEM and LPM) of the FIB when routing entries are installed in (or removed from) the FIB. As such, network devices (e.g., the software or hardware comprising such network devices) may be freed to perform other tasks while routing entries may be more quickly installed in the FIB at the network device.

Looking now at FIG. 1, a system 100 including an embodiment of a network device 102 adapted for the storing and distribution of routes in different tables based on prefix length and lookup strengths is depicted. Here, network device 102 may be connected to a layer 3 (L3) network 104 and a layer 2 (L2) network 106. Network device 102 may be located in layer 2 network 106, such as at the edge of layer 2 network 106, but network device 102 may be located in other positions in system 100. Layer 2 network 106 may be connected to devices 108, which may be servers, hosts, or other devices, that are connected in a sub-network. Layer 3 network 104 may be an external network that is external to layer 2 network 106.

Network device 102 may transmit packets to devices via the external networks using layer 3 network 104. In this example, network device 102 operates as a router that routes the packets using layer 3 addresses for the devices. Layer 3 addresses may be Internet Protocol (IP) addresses. Network device 102 may also transmit packets via layer 2 network 106 between devices 108. Layer 2 addresses may be media access control (MAC) addresses. In this example, network device 102 uses layer 2 addresses for devices 108 and operates as a switch.

Network device 102 includes a forwarding engine 110 that processes packets that are transmitted on layer 3 network 104 or layer 2 network 106. Forwarding engine 110 may receive a packet, which includes a source address and a destination address, and then use one of an exact match (EM) table 112 and a longest prefix match (LPM) table 114 to determine a next hop for the packet.

In some embodiments, EM table 112 and LPM table 114 can include forwarding information, including an FIB comprising routing entries. For example, EM table 112 and LPM table 114 store routing table entries for the one or more routing protocols that are used by forwarding engine 110, by using any of the routing protocols known in the art such as routing information protocol (RIP), border gateway protocol (BGP), open shortest path first (OSPF), intermediate system-intermediate system (IS-IS), interior gateway routing protocol (IGRP), enhanced IGRP (EIGRP), or another type of (e.g., unicast) routing protocol known in the art. In certain cases, EM table 112 and LPM table 114 can store routing information for Internet Protocol (IP) v4 or IPv6 addresses, while in certain cases the forwarding information applies to virtual routing and forwarding (VRF) where the VRF identifier is part of the key being looked up in both the LPM table and the EM table.

EM table 112 and LPM table 114 can be stored in software (e.g., the main memory of network device 102) or can be stored in hardware (e.g., specialized fast performing hardware data structure such as a ternary content-addressable memory (TCAM), a multi-level trie, or another type of specialized memory). In some embodiments, EM table 112 is implemented as a hash table in hardware. LPM table 114 can be implemented in a variety of ways including combinations of TCAM and memory or multi-level hash table.

Entries in EM table 112 and LPM table 114 may be referred to as routing entries (or address routes), and may include a route (e.g., an address or address range such as a subnet) and a next hop. The next hop may be a next step in the route in which a packet is transmitted, such as an interface that is used by the network device 102 to transmit a packet with an address that matches the entry. For a given destination address, the network device 102 performs address lookups on the destination address using both EM table 112 and LPM table 114. Based on these results, network device 102 decides which address lookup result to use. In some embodiments, network device 102 performs these address lookups concurrently.

EM table 112 and LPM table 114 may each be implemented as a single table or as multiple tables. In some embodiments, EM table 112 is used to perform exact match address lookups, such that EM table 112 includes a hash table that is used for exact match address lookup to determine a next hop for a packet. The routing entries in EM table 112 may be programmed as key-value pairs. Forwarding engine 110 looks up an entry in EM table 112 using a key, and if the key is present, the look-up returns the value associated with the key. For the look-up to be successful, the key that is looked up has to match exactly with the key that was stored in the table. Although exact matches are described, in some embodiments, EM table 112 can be a different type of table that does not require exact matches (e.g., TCAM). In some embodiments, EM table 112 is stored in memory that is different from a TCAM. For example, exact match table 112 is stored in memory that may be (much) less expensive than a TCAM.

EM table 112 may be used to perform address lookups for matches with specific prefix lengths. An address prefix length is the number of bits set in the mask of the address. EM table 112 may have a configuration that specifies certain prefix lengths are stored as route entries. In some embodiments, network device 102 uses EM table 112 by looking up a single prefix length but effectively stores different prefix lengths for keys. For example, entries can be stored for 22, 23, and 24 bit prefixes or entries with different length prefixes, but the exact match lookup is done for 21 bit length. In this example, routes with 24 bit prefixes (e.g., /24) can be combined to a common route stored in EM table 112. In some embodiments, to increase the efficiency of the EM table multiple routes in a routing table (e.g., the FIB) may be included in a single entry in an EM table. A next hop selection may use more bits from a data packet than was initially used for a lookup in the EM table 112.

To use EM table 112 for address lookups, network device 102 may generate a key of up to N bits of the destination address and use this key to perform the exact match address lookup. In some embodiments, network device 102 can generate multiple keys from the same destination address (e.g., using different numbers of bits of a destination address) and use these keys to perform multiple exact match address lookups for that destination address. These lookups with different prefix lengths could be done in different exact match tables or in the same one provided that the lookup for different prefix lengths were distinguished by a key that is also part of the exact match lookup. For example, if network device 102 is performing both a 23 and 19 bit prefix lookup, the lookup for the 23 bit prefix would be 1'b0 followed by the first 23 bits of the destination IP address then all zeroes afterwards and the lookup for 19 bit address would be 1'b1 followed by the first 19 bits of the destination IP address and then all zeroes. In some embodiments, performing multiple lookups (e.g., using EM table 112 and LPM table 114) or with multiple keys, there is the potential for multiple address lookup results. In some embodiments, forwarding engine 110 determines which lookup results are to be used for the destination address.

In another embodiment, EM table 112 can store multiple results in a single exact match table entry. If the exact match result is wider than the next hop encoding or if the exact match table lookup is limited to fewer possible next hops, forwarding engine 110 encodes a power of 2 next hops per exact match table lookup. In this embodiment, forwarding engine 110 uses more bits from the destination address lookup to resolve which one of the actual next hops is chosen. For example, if a lookup for a /24 key in exact match table 112 is performed, where an entry is encoded with two next hops per result, forwarding engine 110 can store two adjacent /25 routes as a single entry in the hash table. forwarding engine 110 then uses bit 25 of the destination address to resolve which of the next hops to use.

Furthermore, and in some embodiments, forwarding engine 110 can store shorter prefixes using multiple table entries in EM table 112. Assuming that forwarding engine 110 performs lookups using 24-bit keys (e.g., looking up /24 routes in the hash table), forwarding engine 110 could store prefixes shorter than /24 routes using multiple EM table 112 entries. For example, a /23 route can be stored in EM table 112 by inserting 2 /24 route entries in EM table 112 by expanding the shorter /23 prefix into the two /24 prefixes. Similarly, for a /22 route, network device 102 expands the /22 route into 4 /24 routes.

As described above, network device 102 also includes LPM table 114. In some embodiments, network device 102 uses LPM table 114 to store entries for a longest prefix match type of address lookup, but other types of lookups may be appreciated. EM table 112 and LPM table 114 may have different types of lookups for address routes. Network device 102 may store entries in LPM table 114 as key value pairs. In some embodiments, forwarding engine 110 uses the destination addresses as the key for the address lookup. Forwarding engine 110 looks up an entry in LPM table 114 using the key, and if the key is present, the lookup returns the value associated with the key. It is possible that multiple matches may occur for the key. For example, the prefix used to perform the lookup may be associated with multiple keys in LPM table 114. The lookup selects the key from LPM table 114 that matches the key having the most number of bits (e.g., the most specific key) that match. For example, if one forwarding entry can match 16 bits of an address and another forwarding entry matches 24 bits of an address, forwarding engine 110 uses the second forwarding entry for the longest prefix match as matching 24 bits is longer than matching 16 bits. If the key being looked up does not match any entry at all, a default value may be returned. In some embodiments, LPM table 114 may be a trie data structure. Also, in some embodiments, LPM table 114 is stored in a TCAM, so that some or all of the entries in LPM table 114 can be searched concurrently.

As described above, the forwarding engine 110 can use two different types of address lookups: an exact match address lookup using a key lookup with EM table 112 and a longest prefix match address lookup using the address with LPM table 114. In some embodiments, forwarding engine 110 can perform both address lookups concurrently. Forwarding engine 110 determines a next hop for a destination address by performing the exact match address lookup and also performing a longest prefix match address lookup with the destination address. Forwarding engine 110 uses the results of the two address lookups and decides which result to use for the next hop decision. In some embodiments, forwarding engine 110 performs one or both of the address lookups to determine a next hop for the destination address. In some embodiments, forwarding engine 110 performs the two address lookups concurrently by overlapping the time periods in which the two address lookups are performed.

As mentioned, EM table 112 may not be utilized to store route entries for routes of all prefix lengths (e.g., from 0 to 32). Instead, in one implementation, a number of prefix lengths (e.g., two) may be selected to be stored in the EM table. Accordingly, routes that have a prefix length that matches those configured prefix lengths are eligible to be stored in the EM table 112 while other routes may be stored in the LPM table 114. In some cases, routes associated with the configured prefix lengths for the EM table 112 may be optimized, whereby these optimized routes are installed in the EM table 112 and the remaining routes are stored in the LPM table 114. For example, forwarding engine 110 may be configured to store routes with prefix length of /24 in the EM table 112 (e.g., where routes of prefixes /24, /23 or /22 are compressed to routes of prefix /21 in EM table 112).

Embodiments allow routes with more specific prefixes to be stored in the LPM table 114, while configured prefix lengths to be stored in the EM table 112, while routes with less specific prefixes can simultaneously be stored in the LPM table 114, where the correct (e.g., most specific route) may be selected for forwarding when a lookup is performed, regardless of the location (e.g. EM table 112 or LPM table 114) where that route is stored.

In particular, forwarding engine 110 may maintain lookup strengths associated with different prefix lengths. For example, a lookup strength can be associated with a particular prefix length (i.e., one or more prefix lengths or ranges of prefix lengths) and a table of the FIB (e.g., the EM table 112 or the LPM table 114). As such, this lookup strength can be configured so that a lookup strength for certain prefix length routes in one of the tables comprising the FIB (e.g., the EM table 112) may be set at one strength while a lookup strength for more specific (longer) prefix lengths that are stored in another table of the FIB (e.g., the LPM table 114) may be set at another, greater, strength.

Accordingly, when a forwarding engine 110 performs a lookup for a packet received at network device 102, the forwarding engine 110 can perform an exact match address lookup in EM table 112 and also perform a longest prefix match address lookup in LPM table 114 with the destination address (e.g., an IPv4 or IPv6 address). Any matching entries from each of the tables 112, 114 can be identified along with their corresponding lookup strength as determined based on the prefix lengths of the matching entries, the table (e.g., the EM table 112 or LPM table 114) in which the matching entries reside, and the lookup strengths for those tables and prefix lengths as defined in the lookup strengths. The routing data of the matching entry with the highest lookup strength can then be utilized to perform packet forwarding processing (e.g., routing the packet accordingly). In this manner, a lookup result comprising the most specific route (e.g., the route with the longest prefix) may be selected regardless of the location (e.g., in the EM table 112 or LPM table 114) where the entry matching the lookup resides.

Similar lookups can be performed in the EM table 112 and LPM table 114 for almost any feature implemented at the network device 102 that utilizes such routing information. As but one example, these lookup strengths may be employed when performing an RPF lookup for RPF processing of a packet, such that a matching entry (e.g., for an IPv4 or IPv6 source address) with a highest lookup strength can be accessed to determine the routing data of that entry for a RPF check. In this manner, the lookup result comprising the most specific route (e.g., the route with the longest prefix) may be utilized for RPF processing regardless of the location (e.g., in the LPM or EM) where the entry matching the lookup resides. The utilization of lookup strengths for performing lookups for routing data in EM table 112 and LPM table 114 in association with other functionality of network device 102 may be imagined and are fully contemplated herein.

Figure 2:
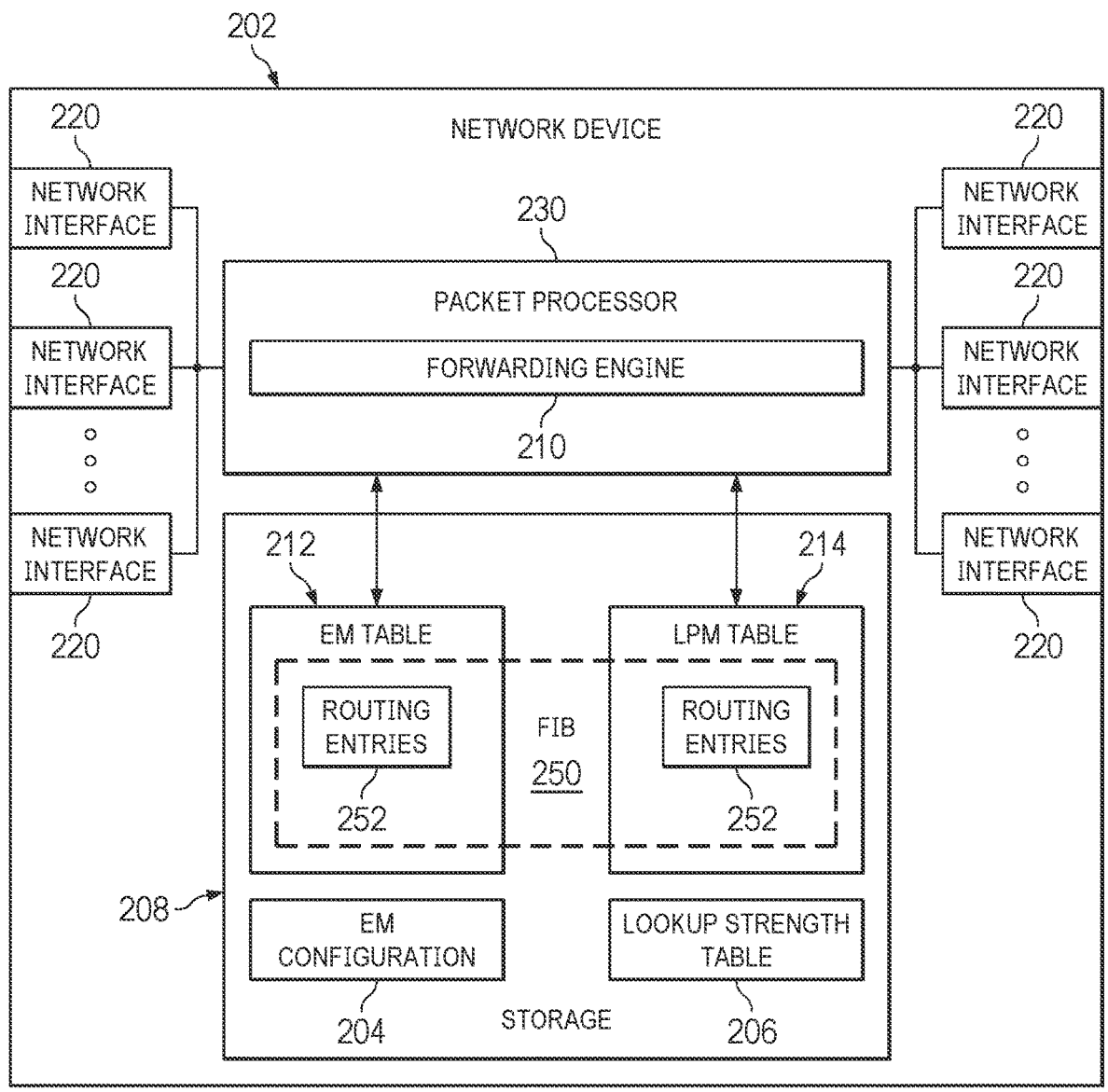
FIG. 2 is a block diagram depicting a general architecture of a network device for storing and selection of routes based on prefix length.

Moving then to FIG. 2, a more detailed depiction of a network device 202 adapted for the storing and distribution of routes in different tables based on prefix length and lookup strengths is depicted. Network device 202 may be a router, switch, server, or any other computing device that may be configured to control or process network traffic. The network device 202 may receive data, including packets from hosts (not shown) coupled (directly or indirectly) to network interface 220. These network interfaces 220 may be any type of network interface, such as an RJ45 ethernet port, a coaxial port, etc. These packets may be provided to packet processor 230 through an I/O path or the like. Packet processor 230 should be understood to mean any general purpose or specialized circuitry (and any instructions or software executing thereon) based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores) that may comprise a single processor or be distributed across multiple separate processors or processing units.

Storage 208 (i.e., memory) may be one or more electronic storage devices or combinations of electronic storage devices that includes volatile memory, which does not retain its contents when power is turned off, and non-volatile memory, which does retain its contents when power is turned off. As referred to herein, the phrase storage or memory should be understood to mean any device for storing electronic data, computer software, instructions, or firmware, such as, processor registers or memory, cache memory, Random Access Memory (RAM), content-addressable memory (CAM) (including a TCAM), hard drives, optical drives, solid state devices, quantum storage devices, or any other suitable fixed or removable storage devices, or any combination of the same.

According to embodiments, packet processor 230 may implement forwarding engine 210 (i.e., forwarding engine 210 may be implemented by hardware of packet processor 230, implemented by instructions executing on hardware of packet processor 230, or implemented by some combination of hardware of packet processor 230 and instructions executing on hardware of packet processor 230). Forwarding engine 210 may receive packets (e.g., received at network device 202), which includes a source address and a destination address, forward the received packet using FIB 250 comprising routing entries 252. Each of the routing entries 252 may include a route defining an address or address range (e.g., a subnet) with an associated prefix length, and corresponding routing data comprising a next hop.

Routing entries 252 may be stored across multiple tables, where these tables may utilize different types of lookups. Specifically, according to embodiments, routing entries 252 for FIB 250 may be stored in an EM table 212 and a longest prefix match LPM table 214 in storage 208. EM table 212 can, for example, be used to perform exact match lookups while LPM table 214 may utilize a longest prefix match type of lookup, as discussed. In certain cases, EM table 212 may not be utilized to store routing table entries 252 comprising routes (e.g., addresses or address ranges) of all prefix lengths. Instead, the selection of which routing entries 252 to store in the EM table 212 or LPM table 214 may be made based on the prefix length of the routes (e.g., addresses) of those routing entries 252.

According to embodiments then, an EM configuration 204 can be configured at the network device 202 where the EM configuration 204 specifies the prefix lengths to be stored in the EM table 212. This EM configuration 204 may, for example, be specified by a user of network device 202 using a command line (or other type of) interface, or otherwise manually or automatically configured. For example, EM configuration 204 may specify two (or more) prefix lengths (e.g., /20, /24). Accordingly, routing entries 252 with routes that have a prefix length that matches those configured prefix lengths in EM configuration 204 are eligible to be stored in the EM table 212 while other routes may be stored in the LPM table 214. Thus, when routing entries 252 are installed in the FIB 250 (e.g., by forwarding engine 210), the EM configuration 204 may be utilized to determine where to install such routing entries 252 such that routing entries 252 with prefix lengths specified in the EM configuration 204 may be installed into the EM table 212 and routing entries 252 with routes having other prefix lengths can be installed into the LPM table 214. In some cases, route entries 252 associated with the configured prefix lengths in EM configuration 204 may be optimized, whereby these optimized routing entries 252 are installed in the EM table 212 and the remaining routes are stored in the LPM table 214.

It will be noted that operating in this manner may give rise to situations where two or more associated routing entries 252 may exist in EM table 212 and LPM table 214 where those associated routing entries 252 may have associated routes (e.g., addresses that are at least partially the same, or where a search in the FIB 250 based on a particular address or portion of address may match the associated routing entries 252) with different prefix lengths. Specifically, as only route entries 252 with routes of the prefix length defined in EM configuration 204 may be stored in EM table 212 in certain embodiments, it may be the case during operation of the network device 202 that two (or more) associated route entries 252 may be stored in FIB 250 where one of those associated route entries 252 with a route with a less specific prefix is stored in EM table 212 while another routing entry 252 with a more specific prefix is stored in LPM table 214.

To ensure that route entries 252 with routes having less specific (shorter) prefix lengths may be stored in the EM table 212 while associated route entries 252 with more specific (longer) prefix lengths are simultaneously stored in the LPM table 214, lookup strengths associated with different prefix lengths may be utilized in certain embodiments. These lookup strengths can be used to assign lookup strengths to matching routing entries 252 in FIB 250 when performing a lookup on a destination address when routing a packet, allowing the strongest (e.g., highest or lowest) matching routing entry 252 to be determined, and the route of this strongest matching routing entry 252 to be used for sending the packet.

Specifically, embodiments may utilize a lookup strength table 206 (i.e., any data structure or association) whereby a particular prefix length (i.e., one or more prefix lengths or ranges of prefix lengths) can be associated with either the EM table 212 or the LPM table 214 and an associated lookup strength. This lookup strength table 206 may, for example, be configured by the forwarding engine 210 based on the EM configuration 204 or otherwise configured. In this manner, when performing a lookup in the EM table 212 or the LPM table 214, a matching result may be assigned the lookup strength configured in the lookup strength table 206 based on the table 212, 214 in which the matching routing entry 252 is located and the prefix length of the route of the matching routing entry 252.

In particular, this lookup strength table 206 can be configured such that a lookup strength for routing entries 252 including certain prefix length routes in the EM table 212 may be set at one strength while a lookup strength for more specific (longer) prefix lengths that are stored in the LPM table 214 may be set at another, greater, strength. In such instances, the lookup strength table 206 may be configured based on the length of the prefix(es) configured in the EM configuration 204. For example, as discussed, EM configuration 204 may indicate the configuration of network device 202 whereby certain prefix lengths specified therein (e.g., a prefix length associated with optimized routes) may be stored in the EM table 212. In such instances, the lookup strength table 206 may be configured such that the lookup strength for those prefix lengths specified by the EM configuration 204 is set at a particular strength (e.g., and associated with EM table 212). Additionally, the lookup strength table 206 may be configured so a greater lookup strength (than the lookup strength assigned to the prefix lengths specified by the EM configuration 204) is associated with prefix lengths in the LPM table 214 that are more specific than the prefix lengths which are to be stored in the EM table 212 (e.g., as specified by the EM configuration 204).

Accordingly, when a packet with a particular destination address is received at the forwarding engine 210 of the network device 202, forwarding engine 210 may cause a lookup based on the destination address to be performed in both the EM table 212 and the LPM table 214 comprising the FIB 250. As noted previously, forwarding engine 210 can use two different types of address lookups: an exact match address lookup using a key lookup with EM table 212 and a longest prefix match address lookup using the address with LPM table 214. In some embodiments, forwarding engine 210 can perform both address lookups concurrently.

Any matching routing entries 252 for those lookups from each of the EM table 212 and LPM table 214 can be identified along with the corresponding lookup strength for each of the matching routing entries 252. The lookup strengths for each of the matching routing entries 252 are determined based on the prefix length of the route of the matching routing entry 252, the table (EM table 212 or LPM table 214) in which the matching routing entry 252 was matched, and the lookup strength for that table and prefix length as defined in the lookup strength table 206. The matching routing entry 252 with the greatest (e.g., highest or lowest) lookup strength is used to determine the routing data (e.g., the next hop) of that matching routing entry 252, and the packet is sent by the forwarding engine 210 from the network device 202 according to that routing data. In this manner, the lookup result comprising the most specific route (e.g., the route with the longest prefix) may be selected by forwarding engine 210 for forwarding the packet regardless of the location (e.g., in the LPM table 214 or EM table 212) where that matching routing entry 252 resides.

Moreover, while embodiments have been described with respect to the lookup of routing entries 252 in EM table 212 and LPM table 214 for packet forwarding, the lookup of routing entries 252 in FIB 250 for almost any other purpose may similarly make use of lookup strengths in a similar manner without loss of generality. As but one example, these lookup strengths may be employed when performing an RPF lookup, such that a matching routing entry 252 with a greatest lookup strength can be accessed to determine the routing data of that entry 252 for the RPF check. In this manner, the lookup result comprising the most specific route (e.g., the route with the longest prefix) may be utilized for RPF regardless of the location (e.g., in the LPM table 214 or EM table 212) where the entry 252 matching the lookup resides.

Figure 3A:
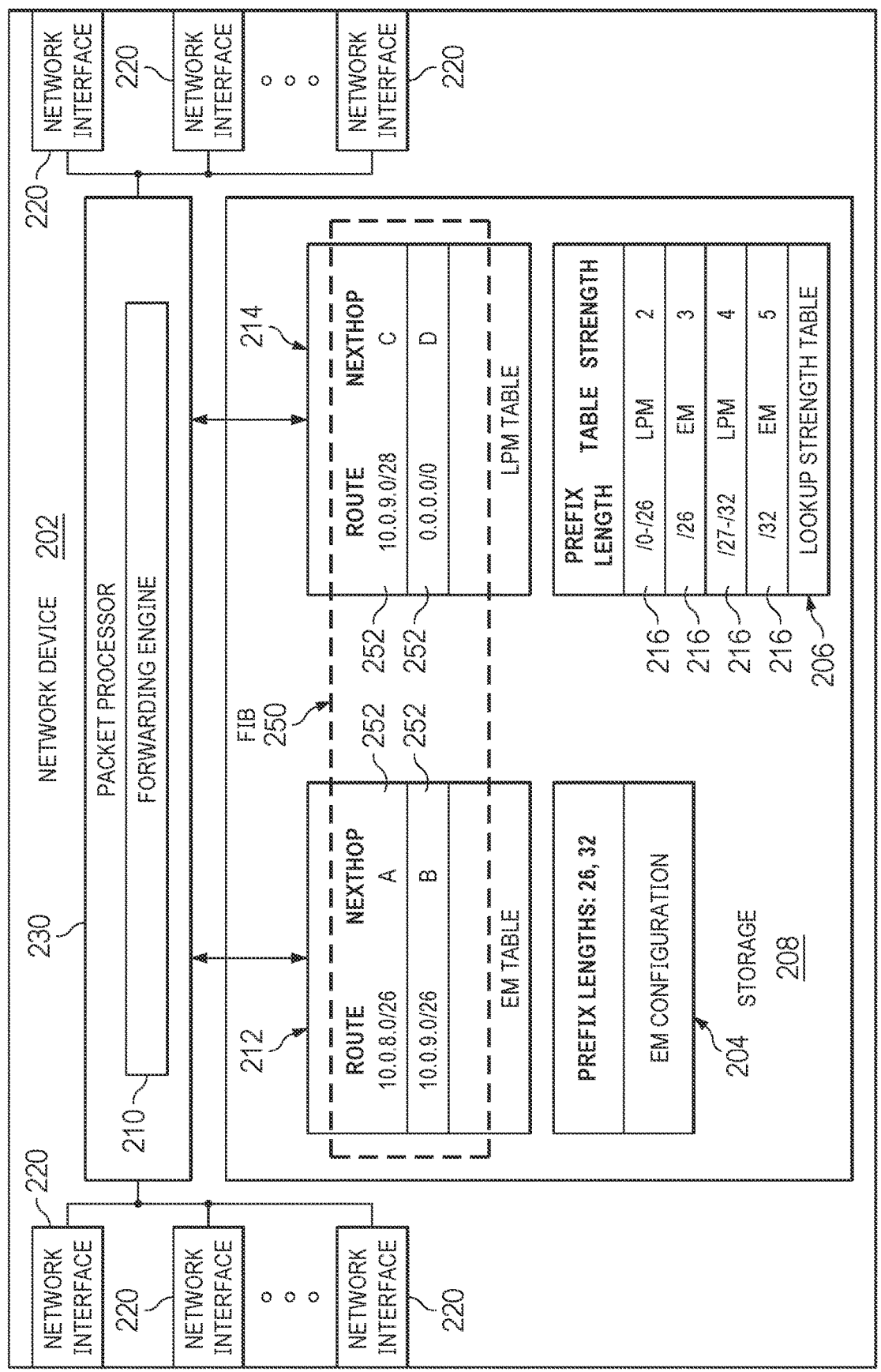
FIGS. 3A-3D are block diagrams depicting examples of route storage, distribution and selection using an embodiment of a network device.

With that in mind, FIGS. 3A-3D depict some examples of the use of lookup strengths in matching routing entries with routes of different prefix lengths in the context of packet forwarding when those routing entries are stored across an EM table and an LPM table. Referring first to FIG. 3A, assume for purposes of this example that EM configuration 204 specifies that routing entries 252 with routes having a prefix length of /26 or /32 should be stored in EM table 212.

Further assume that lookup strength table 206 has four entries 216. Each of those entries 216 comprises a specified prefix length, a specified table (e.g., EM table 212 or LPM table 214) and an associated lookup strength. Thus, one entry 216 may specify that matching routing entries 252 with routes of prefix length /32 in the EM table 212 are to be assigned a lookup strength of 5, another entry 216 may specify that matching routing entries 252 with routes of prefix length /27-32 in the LPM table 214 are to be assigned a lookup strength of 4, an entry 216 may specify that matching routing entries 252 with routes of prefix length /26 in the EM table 212 are to be assigned a lookup strength of 3 and an entry 216 may specify that matching routing entries 252 with routes of prefix length /0-26 in the LPM table 214 are to be assigned a lookup strength of 2.

Now assume for purposes of this example that FIB 250 includes the following routing entries 252 with associated next hops (for purposes of this example designated by an exemplary letter). Route 0.0.0.0/0 has next hop D, route 10.0.8.0/26 has next hop A, route 10.0.9.0/26 has next hop B and route 10.0.9.0/28 has next hop C. Moreover, assume that routing entry 252 for 10.0.8.0/26 and next hop A is in EM table 212, routing entry 252 for 10.0.9.0/26 and next hop B is in EM table 212 and routing entry 252 for 10.0.9.0/28 and next hop C is in LPM table 214.

Continuing with this example, suppose now that forwarding engine 210 receives a packet with a destination address of 10.0.9.1. Here, when forwarding engine 210 performs a lookup based on this destination address in EM table 212 the routing entry 252 with route 10.0.9.0/26 and next hop B will match with a strength of 3. When forwarding engine 210 performs a lookup based on this destination address in LPM table 214 the routing entry 252 with route 10.0.9.0/28 and next hop C will match with strength 4. Thus, forwarding engine 210 may utilize the matching routing entry route 10.0.9.0/28 and next hop C based on the greater matching strength of this routing entry 252 and send the packet according to next hop C of that matching entry 252, despite that this matching routing entry 252 is located in LPM table 214.

Figure 3B:
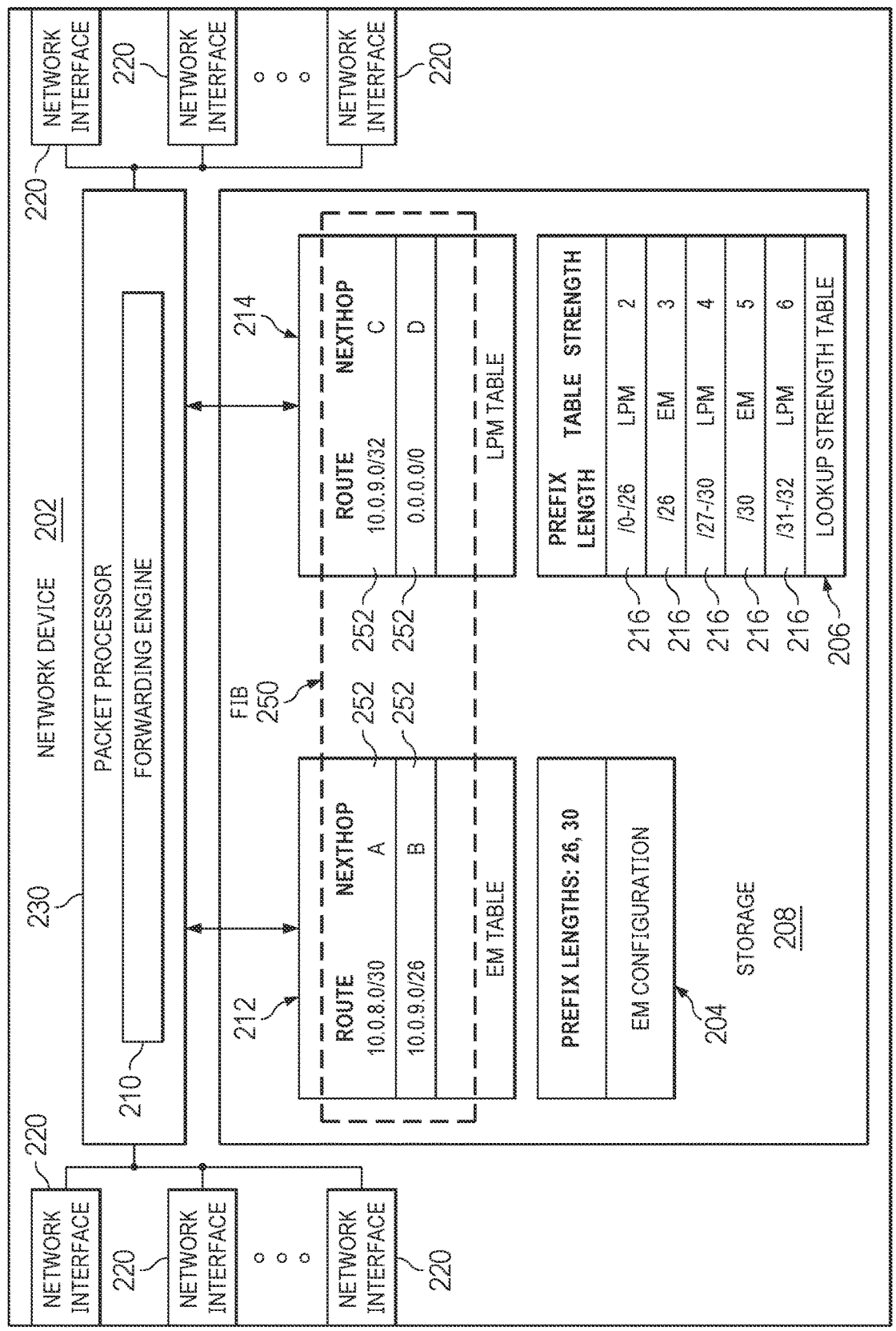

Moving on to FIG. 3B, for purposes of this example assume that EM configuration 204 specifies that routing entries 252 with routes having a prefix length of /26 or /30 should be stored in EM table 212. Further assume that lookup strength table 206 has five entries 216. Each of those entries 216 comprises a specified prefix length, a specified table (e.g., EM table 212 or LPM table 214) and an associated lookup strength. Thus, one entry 216 may specify that matching routing entries 252 with routes of prefix lengths /31-/32 in the LPM table 214 are to be assigned a lookup strength of 6, another entry 216 may specify that matching routing entries 252 with routes of prefix length /30 in the EM table 212 are to be assigned a lookup strength of 5, another entry 216 may specify that matching routing entries 252 with routes of prefix length /27-30 in the LPM table 214 are to be assigned a lookup strength of 4, yet another entry 216 may specify that matching routing entries 252 with routes of prefix length /26 in the EM table 212 are to be assigned a lookup strength of 3 and an entry 216 may specify that matching routing entries 252 with routes of prefix length /0-26 in the LPM table 214 are to be assigned a lookup strength of 2.

Now assume for purposes of this example that FIB 250 includes the following routing entries 252 with associated next hops (for purposes of this example designated by an exemplary letter). Route 0.0.0.0/0 has next hop D, route 10.0.8.0/30 has next hop A, route 10.0.9.0/26 has next hop B and route 10.0.9.0/32 has next hop C. Moreover, assume that routing entry 252 for 10.0.8.0/30 and next hop A is in EM table 212, routing entry 252 for 10.0.9.0/26 and next hop B is in EM table 212 and routing entry 252 for 10.0.9.0/32 and next hop C is in LPM table 214.

Continuing with this example, suppose now that forwarding engine 210 receives a packet with a destination address of 10.0.9.0. Here, when forwarding engine 210 performs a lookup based on this destination address in EM table 212 the routing entry 252 with route 10.0.9.0/26 and next hop B will match with a strength of 3. When forwarding engine 210 performs a lookup based on this destination address in LPM table 214 the routing entry 252 with route 10.0.9.0/32 and next hop C will match with strength 6. Thus, forwarding engine 210 may utilize the matching routing entry route 10.0.9.0/32 and next hop C based on the greater matching strength of this routing entry 252 and send the packet according to next hop C of that matching entry 252, despite that this matching routing entry 252 is located in LPM table 214.

Figure 3C:
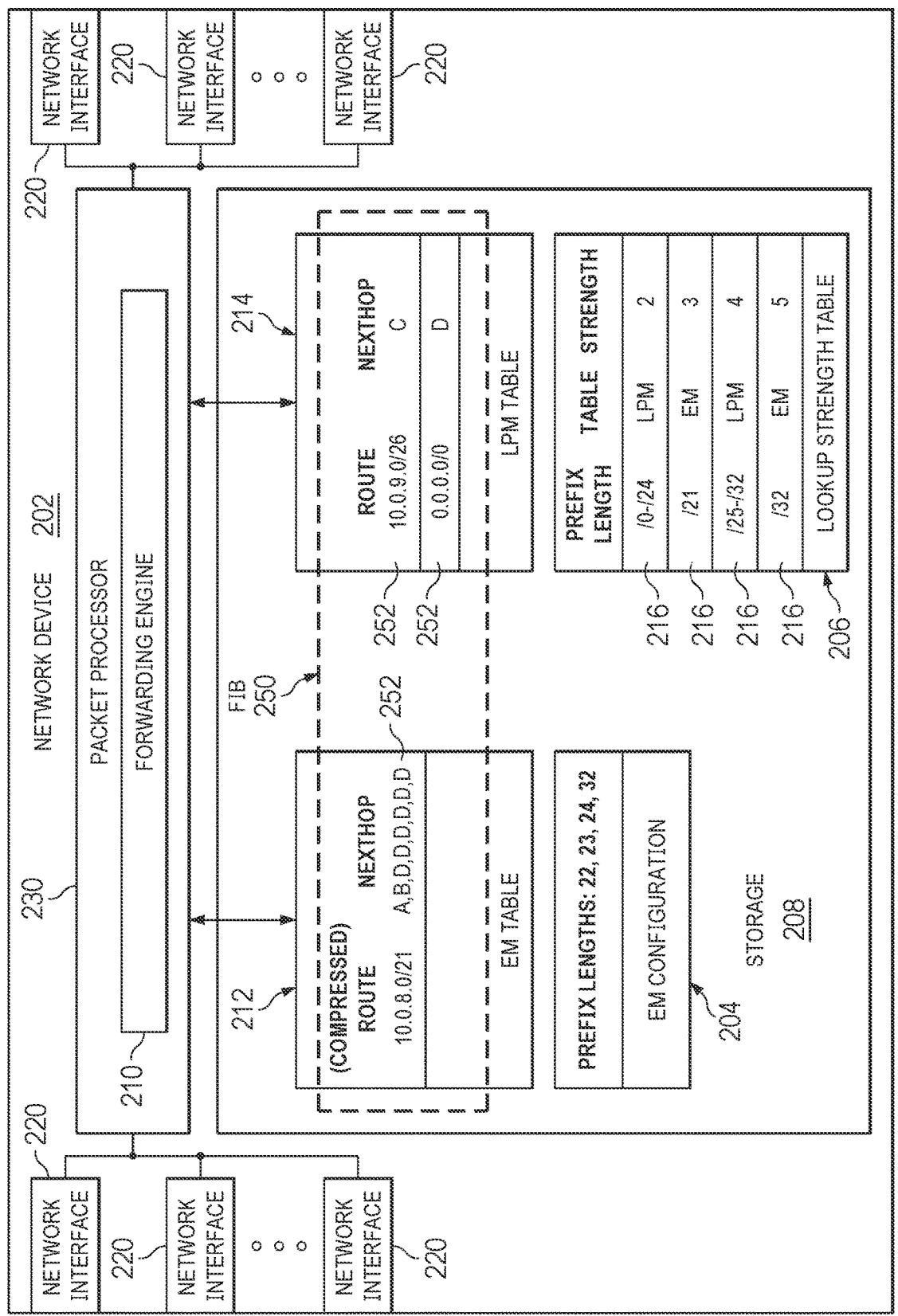

As discussed above, in certain embodiments, routing entries 252 in FIB 250 may be optimized. For example, routing entries 252 in EM table 212 may include compressed routes. FIG. 3C depicts an example where such optimized routes are stored in the EM table 212 and lookup strengths are employed by the network device 202. Specifically, assume for this example, that EM configuration 204 specifies that routing entries 252 with routes having a prefix length of /32 or /24 should be stored in EM table 212. Additionally assume that forwarding engine 210 is configured to compress routes of prefix length /24, /23 or /22 such that routes of these prefix lengths are compressed to routes of prefix /21 and stored in EM table 212 according to the EM configuration 204.

In this example, lookup strength table 206 has four entries 216. Each of those entries 216 comprises a specified prefix length, a specified table (e.g., EM table 212 or LPM table 214) and an associated lookup strength. Thus, one entry 216 may specify that matching routing entries 252 with routes of prefix lengths /32 in the EM table 212 are to be assigned a lookup strength of 5, another entry 216 may specify that matching routing entries 252 with routes of prefix length /25-/32 in the LPM table 214 are to be assigned a lookup strength of 4, an entry 216 may specify that matching routing entries 252 with routes of prefix length /21 in the EM table 212 are to be assigned a lookup strength of 3, and an entry 216 may specify that matching routing entries 252 with routes of prefix length /0-24 in the LPM table 214 are to be assigned a lookup strength of 2.

Now assume for purposes of this example that FIB 250 includes the following routing entries 252 with associated next hops (for purposes of this example designated by an exemplary letter). Route 0.0.0.0/0 has next hop D, route 10.0.8.0/24 has next hop A, route 10.0.9.0/24 has next hop B and route 10.0.9.0/26 has next hop C. Here, the routes 10.0.8.0/24 and 10.0.9.0/24 would get compressed to 10.0.8.0/21 and stored in the EM table 212 in entry 252 associating route 10.0.8.0/21 with next hops A, B, D, D, D, D, D, D in the case of 8:1 compression. Routing entry 252 for 10.0.9.0/26 and next hop C is in LPM table 214.

Suppose now that forwarding engine 210 receives a packet with a destination address of 10.0.9.1. Here, when forwarding engine 210 performs a lookup based on this destination address in EM table 212 the (compressed) routing entry 252 with route 10.0.8.0/21 and next hop B will match with a strength of 3. When forwarding engine 210 performs a lookup based on this destination address in LPM table 214 the routing entry 252 with route 10.0.9.0/26 and next hop C will match with strength 4. Thus, forwarding engine 210 may utilize the matching routing entry route 10.0.9.0/26 and next hop C of LPM table 214 based on the greater matching strength of this routing entry 252 and send the packet according to next hop C of that matching entry 252, despite that this matching routing entry 252 is located in LPM table 214.

Figure 3D:
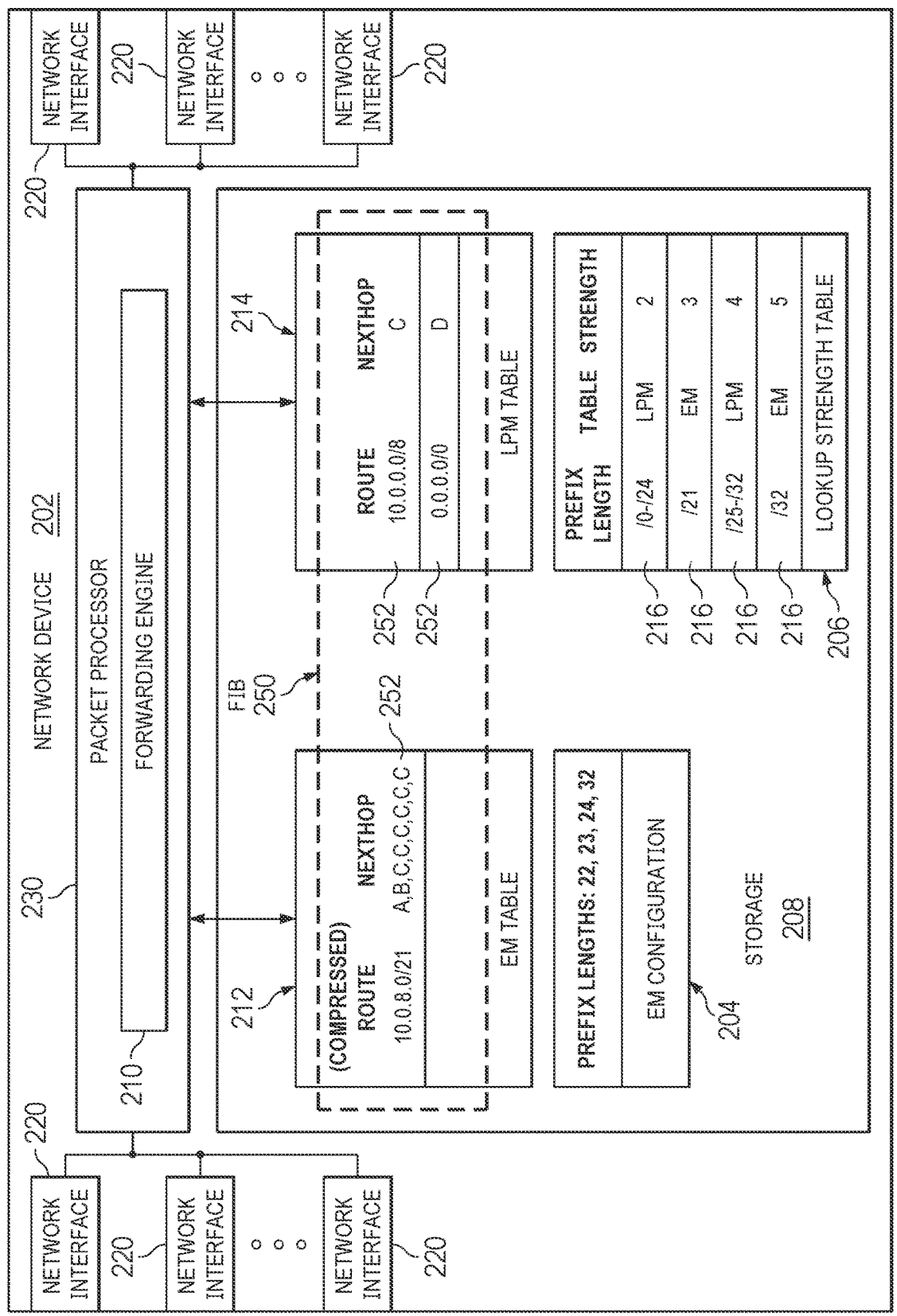

FIG. 3D depicts another example where optimized routes are stored in the EM table 212 and lookup strengths are employed by the network device 202. In this particular example, EM configuration 204 specifies that routing entries 252 with routes having a prefix length of /32 or /24 should be stored in EM table 212. Again, assume forwarding engine 210 is configured to compress routes of prefix length /24, /23 or /22 such that routes of these prefix lengths are compressed to routes of prefix /21 and stored in EM table 212 according to the EM configuration 204.

As in the previous example, lookup strength table 206 has four entries 216. Each of those entries 216 comprises a specified prefix length, a specified table (e.g., EM table 212 or LPM table 214) and an associated lookup strength. Thus, one entry 216 may specify that matching routing entries 252 with routes of prefix lengths /32 in the EM table 212 are to be assigned a lookup strength of 5, another entry 216 may specify that matching routing entries 252 with routes of prefix length /25-/32 in the LPM table 214 are to be assigned a lookup strength of 4, an entry 216 may specify that matching routing entries 252 with routes of prefix length /21 in the EM table 212 are to be assigned a lookup strength of 3, and an entry 216 may specify that matching routing entries 252 with routes of prefix length /0-24 in the LPM table 214 are to be assigned a lookup strength of 2.

Now assume for purposes of this example that FIB 250 includes the following routing entries 252 with associated next hops (for purposes of this example designated by an exemplary letter). Route 0.0.0.0/0 has next hop D, route 10.0.8.0/24 has next hop A, route 10.0.9.0/24 has next hop B and route 10.0.0.0/8 has next hop C. Here, the routes 10.0.8.0/24 and 10.0.9.0/24 would get compressed to 10.0.8.0/21 and stored in the EM table 212 in entry 252 associating route 10.0.8.0/21 with next hops A, B, C, C, C, C, C, C in the case of 8:1 compression. Routing entry 252 for 10.0.0.0/8 and next hop C is in LPM table 214.

Suppose now that forwarding engine 210 receives a packet with a destination address of 10.0.9.1. Here, when forwarding engine 210 performs a lookup based on this destination address in EM table 212 the (compressed) routing entry 252 with route 10.0.8.0/21 and next hop B will match with a strength of 3. When forwarding engine 210 performs a lookup based on this destination address in LPM table 214 the routing entry 252 with route 10.0.0.0/8 and next hop C will match with strength 2. Thus, forwarding engine 210 may utilize the matching routing entry route 10.0.8.0/21 and next hop B of EM table 212 based on the greater matching strength of this routing entry 252 and send the packet according to next hop B of that matching entry 252 in EM table 212.

Figure 4:
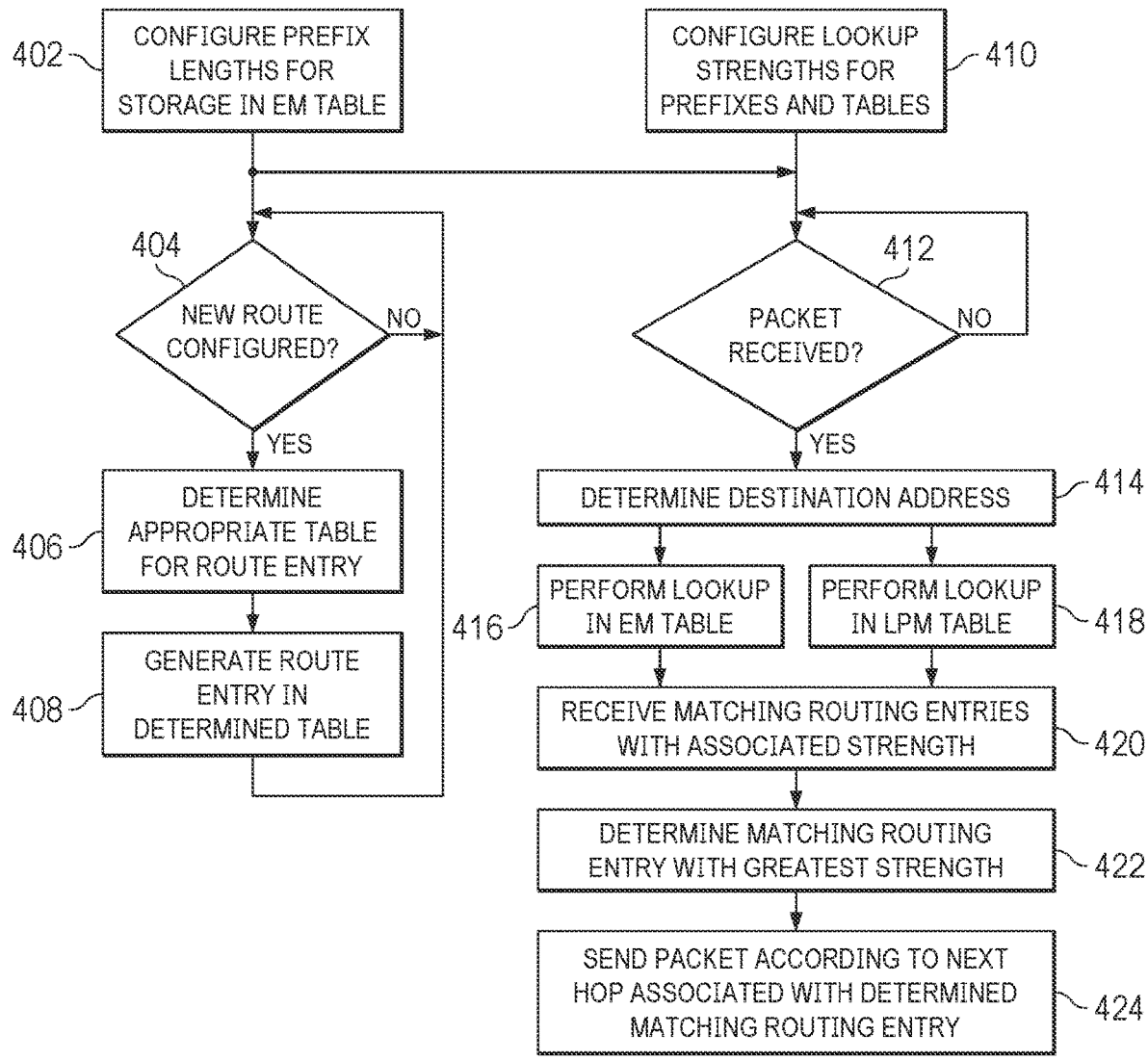
FIG. 4 is a flow diagram for one embodiment of the selection of routes based on lookup strengths for prefix lengths.

Referring now to FIG. 4, one embodiment of a method of the storing and selection of distributed routing entries for packet forwarding based on prefix length and lookup strengths is depicted. Such a method may be employed, for example, by a network device storing routing entries for a FIB in an EM table and a LPM table. Initially, one or more prefix lengths for routes of routing entries to be stored in the EM table may be configured at the network device (STEP 402). This EM configuration specifies prefix lengths such that routing entries associated with routes including those prefix lengths are eligible to be stored in the EM table (e.g., while other routes may be stored in the LPM table at the network device). This EM configuration may, for example, be specified by a user of a network device using a command line (or other type of) interface, or otherwise manually or automatically configured (for example, by a controller). Accordingly, when a new route (e.g., and associated routing data such as a next hop) is determined or otherwise configured at the network device (Y Branch of STEP 404), an appropriate table in which to store the routing entry for that route can be determined based on the EM configuration (STEP 406). A routing entry for that route can then be generated in the determined table (e.g., by creating a routing entry, or modifying an existing routing entry, in the determined table) (STEP 408).

Thus, when routing entries are installed in the FIB of the network device the EM configuration may be utilized to determine where to install such routing entries such that routing entries with prefix lengths specified in the EM configuration may be installed into the EM table and routing entries with routes having other prefix lengths can be installed into the LPM table. In some cases, route entries associated with the configured prefix lengths in EM configuration may be optimized (e.g., compressed), whereby these optimized routing entries are installed in the EM table and the remaining routes are stored in the LPM table.

Lookup strengths associated with different prefix lengths may also be configured (STEP 410). This configuration may, for example, be specified by a user of a network device using a command line (or other type of) interface, or otherwise manually or automatically configured (for example, by a controller). These lookup strengths may associate a particular prefix length (i.e., one or more prefix lengths or ranges of prefix lengths) with either the EM table or the LPM table and an associated lookup strength. These lookup strengths may be configured such that a lookup strength for certain prefix length routes in the EM table may be set at one strength while a lookup strength for more specific (longer) prefix lengths that are stored in the LPM table may be set at another, greater, strength. In such instances, these lookup strengths may be configured based on the length of the prefix(es) configured in the EM configuration. For example, as discussed, EM configuration may indicate that certain prefix lengths may be stored in the EM table The lookup strengths may be configured accordingly such that the lookup strength for those prefix lengths specified by the EM configuration is set at a particular strength (e.g., and associated with the EM table) and a greater lookup strength is associated with prefix lengths in the LPM table that are more specific than the prefix lengths for routes which are to be stored in the EM table (e.g., as specified by the EM configuration).

Accordingly, when a packet is received at the network device (Y Branch of STEP 412) a destination address can be determined from the packet (STEP 414). A lookup based on the destination address can then be performed in both the EM table (STEP 416) and the LPM table (STEP 418). These lookups may entail two different types of lookups, an exact match address lookup using a key lookup for the EM table and a longest prefix match address lookup using the address with the LPM table.

Any matching routing entries for those lookups from each of the EM table and LPM table can be obtained along with the corresponding lookup strength for each of the matching routing entries (STEP 420). The lookup strengths for each of the matching routing entries are determined based on the prefix length of the route of the matching routing entry, the table (EM table or LPM table) in which that matching routing entry was matched. The matching routing entry with the greatest (e.g., highest or lowest) lookup strength is used to determine the routing data (e.g., the next hop) of that matching routing entry (STEP 422), and the packet sent by the network device according to that routing data of the matching routing entry with the greatest strength (STEP 424). In this manner, the lookup result comprising the most specific route (e.g., the route with the longest prefix) may be selected for forwarding the packet regardless of the table in which that matching routing entry resides.

It will be understood that while specific embodiments have been presented herein, these embodiments are merely illustrative, and not restrictive. Rather, the description is intended to describe illustrative embodiments, features and functions in order to provide an understanding of the embodiments without limiting the disclosure to any particularly described embodiment, feature, or function, including any such embodiment, feature, or function described. While specific embodiments of, and examples for, the embodiments are described herein for illustrative purposes only, various equivalent modifications are possible within the spirit and scope of the invention, as those skilled in the relevant art will recognize and appreciate.

As indicated, these modifications may be made in light of the foregoing description of illustrated embodiments and are to be included within the spirit and scope of the disclosure. Thus, while particular embodiments are described, a latitude of modification, various changes and substitutions are intended in the foregoing disclosures, and it will be appreciated that in some instances some features of embodiments of the invention will be employed without a corresponding use of other features, and features described with respect to one embodiment may be combined with features of other embodiments without departing from the scope and spirit of the disclosure as set forth.

What is claimed is:

1. A network device, comprising:
a plurality of network interfaces;
a processor; and
a memory that stores:
a first table utilizing a first type of lookup and having a first plurality of entries, wherein a first entry has a route associated with a first prefix length and corresponding routing data;
a second table utilizing a second type of lookup and having a second plurality of entries, wherein a second entry has a route associated with a second prefix length and corresponding routing data, and the second prefix length is greater than the first prefix length;
a lookup strength table defining a first lookup strength for the first prefix length and first table and a second lookup strength for the second prefix length and second table, wherein the second lookup strength is greater than the first lookup strength and each lookup strength specifies a relative priority of the associated prefix length and table to be utilized in selecting entries from the first table or second table during packet processing;
wherein the network device is adapted to:
receive a packet via a first interface of the network interfaces;
perform a lookup in the first table and the second table based on a destination address of the packet;

based on the lookup, determine the first entry matches the lookup with the first lookup strength and the second entry matches the lookup with the second lookup strength;

access the second entry to obtain the routing data of the second entry based on the second lookup strength of the matching second entry and the first lookup strength of the matching first entry; and send, from an appropriate interface of the network interfaces, the packet according to the obtained routing data.

2. The network device of claim 1, wherein the first table is an Exact Match (EM) table and the second table is a Longest Prefix Match (LPM) table.

3. The network device of claim 2, wherein the first entry of the first plurality of entries is optimized.

4. The network device of claim 3, wherein the optimization comprises a compression of a plurality of routes into the route of the first entry.

5. The network device of claim 1, wherein the first prefix length or second prefix length comprises a range of prefix lengths.

6. The network device of claim 1, wherein the first entry is stored in the first table based on the first prefix length.

7. The network device of claim 6, wherein each of the first plurality of entries comprise routes having the first prefix length.

8. A method, comprising:
configuring a lookup strength table at a network device with a first lookup strength for a first prefix length and an Exact Match (EM) table and a second lookup strength for a second prefix length and a Longest Prefix Match (LPM) table, wherein the second prefix length is greater than the first prefix length and the second lookup strength is greater than the first lookup strength and each lookup strength specifies a relative priority of the associated prefix length and table to be utilized in selecting entries from the EM table or LPM table during packet processing;

storing a first plurality of entries in the Exact Match (EM) table at the network device, wherein a first entry in the EM table has a route associated with the first prefix length and corresponding routing data;

storing a second plurality of entries in the Longest Prefix Match (LPM) table at the network device, wherein a second entry in the LPM table has a route associated with the second prefix length and corresponding routing data;

receiving a packet at the network device;

performing a lookup in the EM table and the LPM table based on a destination address of the packet;

determining the first entry in the EM table matches the lookup with the first lookup strength;

determining the second entry in the LPM table matches the lookup with the second lookup strength;

based on the first lookup strength and the second lookup strength, obtaining routing data of the first entry or the second entry based on the greater of the first lookup strength and the second lookup strength; and sending the packet from the network device according to the obtained routing data.

9. The method of claim 8, further comprising, configuring the network device such that the network device stores entries with routes having the first prefix length in the EM table.

10. The method of claim 9, wherein the entries are optimized.

11. The method of claim 10, wherein the route of each of the plurality of entries in the EM table is associated with a plurality of compressed routes.

12. The method of claim 8, wherein the lookup in the first table and the second table are performed concurrently.

13. A network device, comprising:
a plurality of network interfaces;
a processor; and
a memory that stores:
a first table utilizing a first type of lookup and having a first plurality of entries, wherein a first entry has a route associated with a first prefix length and corresponding routing data;
a second table utilizing a second type of lookup and having a second plurality of entries, wherein a second entry has a route associated with a second prefix length and corresponding routing data, and the second prefix length is greater than the first prefix length;
a lookup strength table defining a first lookup strength for the first prefix length and first table and a second lookup strength for the second prefix length and second table, wherein the second lookup strength is greater than the first lookup strength and each lookup strength specifies a relative priority of the associated prefix length and table to be utilized in selecting entries from the first table or second table during packet processing;

wherein the network device is adapted to:
receive a packet via a first network interface;
perform a lookup in the first table and the second table based on an address associated with the packet;
based on the lookup, determine the first entry matches the lookup with the first lookup strength and the second entry matches the lookup with the second lookup strength;
access the second entry to obtain the routing data of the second entry based on the second lookup strength of the matching second entry and the first lookup strength of the matching first entry; and
processing the packet at the network device based on the obtained routing data.

14. The network device of claim 13, wherein the address is a source address and processing the packet comprises Reverse Path Forwarding (RPF) processing.

15. The network device of claim 14, wherein the source address is an IPv4 address or an IPv6 address.

16. The network device of claim 13, wherein the address is a destination address and the processing comprises packet forwarding processing.

17. The network device of claim 16, wherein the destination address is an IPv4 address or an IPv6 address.

18. The network device of claim 13, wherein the first table is an Exact Match (EM) table and the second table is a Longest Prefix Match (LPM) table.

19. The network device of claim 18, wherein the compressed routes are stored in the EM table.

20. The network device of claim 16, wherein the lookup in the first table and the second table are performed concurrently.

* * * * *